United States Patent [19]

Barbier et al.

[11] Patent Number: 4,809,512

[45] Date of Patent: Mar. 7, 1989

[54] AIR-FUEL INJECTION SYSTEM FOR A TURBOJET ENGINE

[75] Inventors: Gérard Y. G. Barbier, Morangis; Gérard J. P. Bayle-Laboure, Avon; Michael A. A. Desaulty, Vert St Denis; Rodolphe Martinez, Perigny S/ Yerres; Jérome Perigne, Vaux le Penil, all of France

[73] Assignee: Societe Nationale d'Etude et de Construction de Moteurs d-Aviation (SNECMA), Paris, France

[21] Appl. No.: 79,149

[22] Filed: Jul. 29, 1987

[30] Foreign Application Priority Data

Jul. 30, 1986 [FR] France ................................ 86 11011

[51] Int. Cl.⁴ ................................................ F02C 1/00

[52] U.S. Cl. ........................................ 60/748; 60/737

[58] Field of Search ................. 60/737, 738, 740, 743, 60/748, 39.23; 239/402.5, 533.2

[56] References Cited

U.S. PATENT DOCUMENTS

| | | | |
|---|---|---|---|
| 3,811,278 | 5/1974 | Taylor et al. | 60/743 |
| 3,946,552 | 3/1976 | Weindem et al. | 60/748 |
| 3,958,413 | 5/1976 | Cornelius et al. | 60/39.06 |
| 4,534,166 | 8/1985 | Kelm et al. | 60/39.23 |
| 4,653,278 | 3/1987 | Vinson et al. | 60/737 |
| 4,726,182 | 2/1988 | Barbier et al. | 60/737 |

FOREIGN PATENT DOCUMENTS

| | | |
|---|---|---|
| 386159 | 1/1923 | Fed. Rep. of Germany . |
| 2491139 | 2/1982 | France . |
| 2085147 | 4/1982 | United Kingdom . |

*Primary Examiner*—Louis J. Casaregola
*Assistant Examiner*—Timothy S. Thorpe
*Attorney, Agent, or Firm*—Bacon & Thomas

[57] ABSTRACT

An improved swirler system for a turbojet engine combustion chamber is disclosed in which stationary first vanes and moveable second vanes are oriented at different angles with respect to a radius of the fuel injector system. The different angles allow the angle of the incoming air to be adjusted between full power and idle conditions so as to vary the conial shape of the atomized air-fuel mixture according to the operating conditions of the engine. Radial and axial inlet duct portions serve to attenuate the wakes of the air flow generated by the vanes prior to the air passing into the combustion chamber.

7 Claims, 2 Drawing Sheets

AIR-FUEL INJECTION SYSTEM FOR A TURBOJET ENGINE

BACKGROUND OF THE INVENTION

The present invention relates to an air-fuel injection system for a turbojet engine, more particular such a system having an improved air swirler.

Present day turbojet engines are required to generate a high performance level, while at the same time maintaining a low pollution rate. These contradictory parameters have required tradeoffs to be made between full power operational characteristics to minimize smoke emission and maximize the life of the engine components, and low speed operational characteristics such as flame stability and engine efficiency. As the pollution standards become increasingly more strict, the combustion chambers' size and the requirement to utilize a diversity of fuels renders the aforementioned characteristics increasingly difficult to obtain.

Two module combustion chambers are known wherein one of the chambers is intended for low speed operation and the other for full operation. However, these systems increase the bulk and the weight of the engine and, therefore, are not a complete solution to the problem.

It is also known to use variable geometry injection systems wherein diaphragms or flaps control the air intakes to the combustion chambers. This allows a substantial reduction in the combustion volume and, consequently, the bulk of the chamber.

It is known to utilize this type of variable geometry injection systems with aerodynamic injectors having intermediate bowl-shaped members. In this system, the fuel injectors are mounted in the upstream end of the combustion chambers with the intermediate bowl-shaped member interposed between the fuel injector and the combustion chamber. The bowl-shaped member typically comprises a shroud which flares outwardly in the downstream direction and is provided with a plurality of small diameter holes to allow air to enter the atomized fuel cone emanating from the injector. The bowl shaped member produces turbulent air flow to improve the fuel atomization in the air-fuel mixture.

In order to further improve the performance characteristics of these aerodynamic injectors with intermediate bowl-shaped members, the outer swirlers as well as the air intakes of the bowl openings may be equipped with a diaphragm to control the flow of air through these elements in order to match the air-fuel mixture richness at the bowl exhaust to all operating conditions.

U.K. Pat. No. 2,085,147 discloses a typical example of this type of swirler system in which a control diagrham in the form of a thin cylindrical shell surrounds an annular flange defining air intake orifices. Neither the control diaghragm nor the air intake orifices have vane systems therein to guide and deflect the incoming atomizing air. In this particular system, the air guidance is achieved only by means of curved extensions on the outside of the control diaghragm.

U.S. Pat. No. 4,534,166 to Kelm et al. show an axial-type swirler utilized in a combustion chamber structure without having an intermediate bowl shaped member. The slopes of the diaghragm vanes differ from those of the swirler structure such that the air-intake angle can be varied in relation to the operating modes of the engine. However, this system suffers from the drawback that the external swirler is located at the very upstream end of the combustion chamber and substantial wakes or turbulence are presented in the fuel cone due to the location of the swirler vanes. The wakes degrade the air-fuel mixture resulting in less efficient combustion chamber operation. The system shown in Kelm et al. does not permit attenuation of these wakes.

SUMMARY OF THE INVENTION

It is an object of the invention to provide an improved air-fuel injection system for a turbojet engine having a combustion chamber, a fuel injector and an intermediate bowl-shaped member which defines an air intake duct to direct air into the combustion chamber so as to atomize the fuel emanating from the fuel injector.

A plurality of first vanes are attached to the bowl member and disposed in the air intake duct. A control diaghragm is rotatably mounted to the bowl-shaped member and has a plurality of second vanes which may be moved into alignment with, or out of alignment with the first vanes. The first vanes are disposed at an angle $\beta$ with respect to a radius of the bowl shaped member, while the second vanes are disposed at an angle $\alpha$ with respect to a radius of the bowl-shaped member. According to the invention, the angles $\alpha$ and $\beta$ are different from each other in order to enable the swirl angle of the air jet passing through the annual duct to be varied according to the operational mode of the engine.

The annular air intake duct has a radial inlet portion, in which the first and second vanes are disposed, and an axial outlet portion so as to permit the attenuation of the wakes produced by the outer swirler vanes before the air is introduced into the combustion chamber. The radially innermost or downstream edge of each of the first vanes is located approximately in radial alignment with the radially outermost portion of the axial outlet portion of the air intake. The first and second vanes are oriented such that the magnitude of angle $\beta$ is approximately three to four times the magnitude of the angle $\alpha$. In addition, the radial height of the second vanes is approximately three times the radial height of the first vanes.

DETAILED DESCRIPTION OF THE PREFERRED EMBODIMENT

Figure 1:
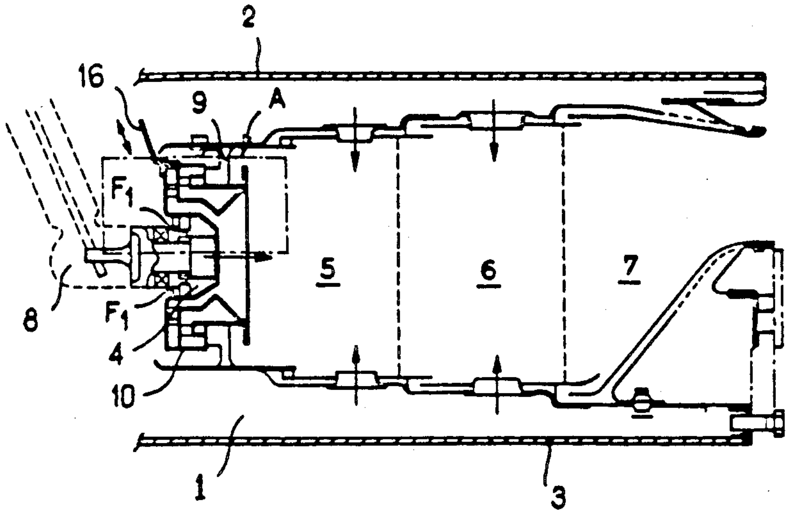
FIG. 1 is a partial, longitudinal cross sectional view of a turbojet engine combustion chamber equipped with the injection system according to the invention.

FIG. 1 shows a partial, longitudinal cross sectional view of an annular combustion chamber 1 of a turbojet engine. The chamber 1 is located between an outer casing 2 and an inner shell 3 which serve as boundaries for the flow of compressed air in known fashion. A fraction F1 of the air emitted from the jet engine compressor (not shown) is guided through the injection system 4 to form the atomized air-fuel mixture. This mixture passes into the primary combustion zone 5 in which the combustion reaction takes place which produces gases which are, in turn, diluted in zone 6 and cooled in secondary downstream zone 7. The gases emanating from the combustion chamber pass through a turbine (not shown) before exiting through the exhaust pipe of the engine into the atmosphere.

The fuel injector 8 is indicated in dashed lines in FIG. 1 and is connected by an intermediate bowl-shaped member 10 to an upstream end 9 of the combustion chamber. The injector, in known fashion, may have an inner swirler (not shown) which may be either radial or axial to project the fuel from the injector nozzle in the form of a frusto-conical jet flaring outwardly in the downstream direction.

Figure 2:
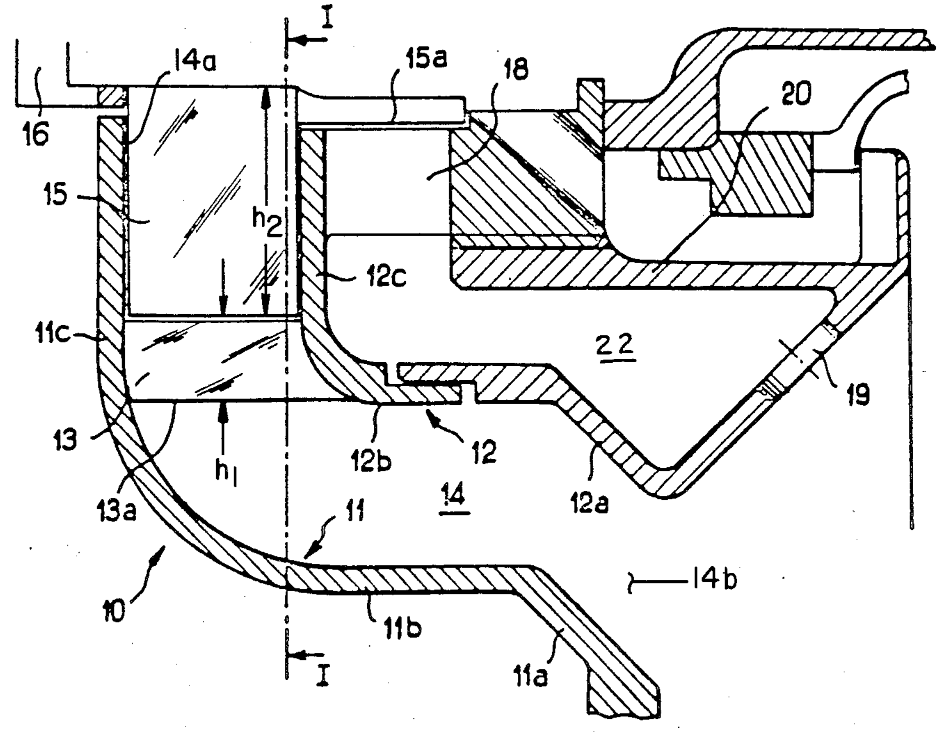
FIG. 2 is a partial, enlarged cross sectional view of the intermediate bowl-shaped member shown in detail A in FIG. 1.

The injector is enclosed by case 11 which also forms the upstream wall of the intermediate bowl-shaped member 10. A downstream portion **11*a* of case 11 defines a frusto-conical portion and is connected to the radial wall portion 11c by a substantially cylindrical portion 11b. Radial wall portion 11c together with radial wall portion 12*c* of intermediate ring 12 defines a radial inlet portion 14*a* of annular duct 14. Intermediate ring 12 also comprises a cylincrical portion 12*b* which interconnects with frusto-conical portion 12*a*, as best seen in FIG. 2. Duct 14 has a generally axial outlet portion 14a defined by walls 11b, 12*b* and 11*a*, 12*a*.**

A plurality of first swirler vanes 13 are mounted in the radial inlet portion of the annular duct 14 such that their downstream edges **13*a* are located on a circle, the diameter of which is approximately equal to the of the cylindrical portion 12*b* of intermediate ring 12. A best seen in FIGS. 3 and 4, each of the vanes 13 define an angle $\beta$ with respect to a radius $r_1$ of the bowl shaped member 10**.

Figure 4:
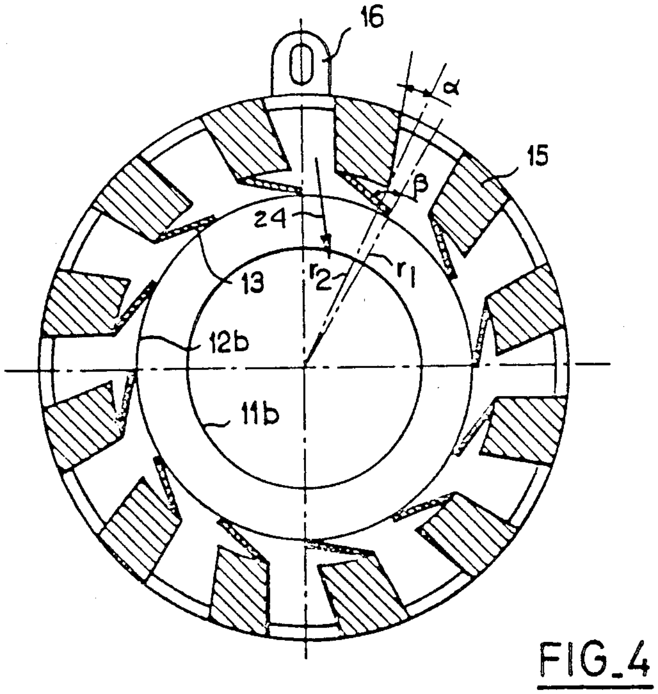
FIG. 4 is a cross sectional view taken along line I—I in FIG. 2 showing the control diaghragm in its full power position.

A control diaghragm 15 has a plurality of second vanes and is rotatably mounted on the bowl-shaped member 10 such that the second vanes extend into the radial inlet portion of annular duct 14. Control diaghragm 15 comprises a circular rim having a control lever 16 to which is attached an actuator (not shown) to rotate the control diaphragm 15 with respect to the bowl-shaped member 10. Each of the second vanes has a radial height $h_2$ of approximately three times the radial height $h_1$ of the first swirler vanes 13. The rotational position of control diaphragm 15 in the full power position is shown in FIG. 4. The first swirler vanes 13 are aligned with the second vanes of diaghragm 15. The air passages between first vanes 13 are substantially completely open to allow the air to pass between the plurality of first vanes and the plurality of second vanes through opening 17 in the direction of arrow 24 shown in FIG. 4.

Figure 3:
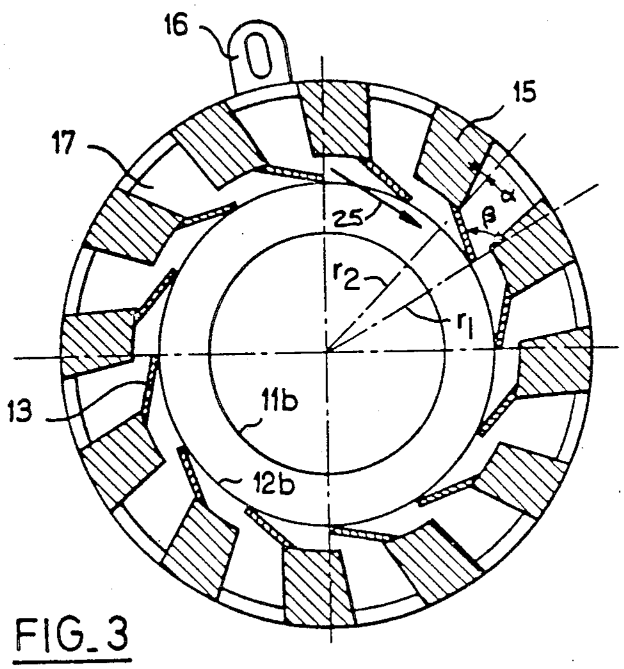
FIG. 3 is a cross sectional view taken along line I—I in FIG. 2 showing the control diaghragm in the idle position.

In response to the operational mode of the turbojet engine, the control diaghragm can be moved from the full power position to the idle position shown in FIG. 3. As can be seen, the second plurality of vanes are out of circumferential alignment with the first vanes 13 such that air passing into the bowl-shaped member is directed in the direction of arrow 25 shown in FIG. 3 after passing through the openings 17 between the second vanes of the control diaghragm 15.

Each of the vanes of control diaghragm 15 are oriented at an angle $\alpha$ with respect to a radius $r_2$ of the bowl-shaped member. Preferably, the magnitude of angle $\beta$ is between the three and four times the magnitude of angle $\alpha$. The angle $\alpha$ preferably has a magnitude of between 20√ and 25°, whereas angle $\beta$ preferably has a magnitude of between 80° and 85°.

At the full power setting shown in FIG. 4, the air passing through annular duct 14 forms a conical fuel sheet having a relatively narrow apex angle such that the fuel sheet spreads out over a great length inside the combustion chamber to optimize the combustion within the chamber. At the idle setting, shown in FIG. 3, the air passing into the combustion chamber via the annular duct 14 has a greater tangential angle and therefore undergoes strong centrifuging such that the atomized fuel cone is modified to include a greater apex angle. As a result, the fuel cone is located very closes to the upstream end of the chamber to improve the combustion stability under idle conditions.

Tests performed with the injection system according to the invention have shown that setting of angle $\beta$ between 80° and 95° will result in optimal stability performance at idle, whereas the full power setting is optimized with angle $\alpha$ equal to between 20° and 25° relative to the radius of the bowl-shaped member.

The bowl-shaped member 10 may also define an impact cooling chamber 22 between intermediate ring 12 and bowl nut 20. Impact cooling chamber 22 is supplied with air from the engine compressor (not shown) through a plurality of orifices 18 in known fashion.

Diaghragm 15 also may comprise an annular portion **15*a* which extends over the air intake orifices 18 and which defines a plurality of openings therethrough. Thus, as the diaghragm 15 is moved between the idle and full power positions, the air passing into the impact cooling chamber 22 through the intake orifices 18 is also controlled by movement of annular portion 15*a*.**

Orifices 19 are also defined in the downstream portion of intermediate bowl member 10 and allow air to evacuate from the impact cooling chamber 22 into the combustion chamber to contribute to the atomization to the fuel. The number of orifices 18 and 19 may be equal to each other or may be different if their diameters are computed to equalize the output flow with the input flow when the diaghragm **15*a*** is fully opened.

The fuel injection system according to the invention provides better air guidance and an improved rotational component to the air issuing from the external swirlers than the known art discussed above. The air acceleration at the exit from the swirler, due to the intrinsic structure of the axial duct 14, takes place before the air is introduced at the neck of the bowl-shaped member and serves to attenuate the wakes caused by the external swirler vanes. Therefore, it is possible to achieve a more homogenous combustion volume in the combustion chamber and to avoid overheated zones than in the chamber according to the known art. Thus, the invention allows the improvement of the service life of the combustion chambers while at the same time greatly improving full power and idle performance.

The foregoing description is provided for illustrative purposes only and should not be construed as in any way limiting this invention, the scope of which is defined solely by the appended claims.

What is claimed is:

1. In an air-fuel injection system for a turbojet engine having a combustion chamber and at least one fuel injector, the improvements comprising:

(a) a bowl-shaped member interposed between the fuel injector and the combustion chamber, the bowl-shaped member defining: an annular air intake duct having a radial inlet portion and a generally axial outlet portion; an impact cooling chamber; and a plurality of openings to permit fluid communication between the impact cooling chamber and the combustion chamber;

(b) A plurality of first swirler vanes attached to the bowl member and disposed in the radial inlet portion of the annular duct to define a plurality of air passages therebetween such that the radially innermost edges of the first vanes are approximately radially aligned with a radially outermost part of the axial outlet portion of the annular duct, each first swirler vane oriented at an angle $\beta$ with respect to a radius of the bowl-shaped member and having a radial height $h_1$;

(c) an air control diaphragm rotatably mounted on the bowl shaped member and having a plurality of second swirler vanes, each second swirler vane oriented at an angle $\alpha$ of between 20° and 25° with respect to a radius of the bowl shaped member such that the magnitude of $\beta$ is between three and four times the magnitude of $\alpha$ and having a radial height $h_2$ and that $h_2$ is approximately equal to $3h_1$ and, (d) means to move the air control diaphragm with respect to the bowl shaped member between a first position wherein the second swirler vanes are substantially circumferentially aligned with the first swirler vanes and a second position wherein the second swirler vanes are circumferentially displaced from the first swirler vanes so as to control the direction of the air flowing through the air passages between the first vanes into the annular air intake duct.

2. The air-fuel injection system according to claim 1 wherein the magnitude of angle $\beta$ is between 80° and 85°.

3. The air-fuel injection system according to claim 1 wherein the number of first swirler vanes is equal to the number of second swirler vanes.

4. The air-fuel injection system according to claim 1 wherein the bowl-shaped member further defines a plurality of air intake orifices allowing communication between a pressurized air source and the impact cooling chamber.

5. The air-fuel injection system according to claim 4 wherein the air control diaphragm further comprises an annular portion extending over the air intake orifices and defining a plurality of openings such that, as the diaphragm is moved relative to the bowl-shaped member, the openings are moved between a first position circumferentially aligned with the air intake orifices and second position out of circumferential alignment with the air intake orifices so as to control the air flow through the intake orifices.

6. The air-fuel injection system according to claim 3 wherein the magnitude of angle $\beta$ is between 80° and 85°.

7. The air-fuel injection system according to claim 6 wherein the number of first swirler vanes is equal to the number of second swirler vanes.

* * * * *

UNITED STATES PATENT AND TRADEMARK OFFICE
CERTIFICATE OF CORRECTION

PATENT NO. : 4,809,512

DATED : March 7, 1989

INVENTOR(S) : Gerard Y. G. BARBIER et al

It is certified that error appears in the above-identified patent and that said Letters Patent is hereby corrected as shown below:

The Assignee should be --Societe Nationale d'Etude et de Construction de Moteurs d'Aviation--.

Col. 1, lines 54, 57, 61, and 65 "diaghragm" should be --diaphragm--.

Col. 2, lines 18, 53, and 56 "diaghragm" should be --diaphragm--.

Col. 3, line 31, "equal to the" should be --equal to that--.

Col. 3, line 32, "A best" should be --As best--.

Col. 3, lines 36, 39, 48, 56, 63, and 64 "diaghragm" should be --diaphragm--.

Col. 3, line 67, "between the three" should be --between three--.

Col. 4, line 13, "closes" should be --close--.

Col. 4, line 18, "95°" should be --85°--.

Col. 4, lines 27, 30 and 41 "diaghragm" should be --diaphragm--.

Signed and Sealed this

First Day of August, 1989

*Attest:*

DONALD J. QUIGG

*Attesting Officer* *Commissioner of Patents and Trademarks*